(12) United States Patent
Yeh

(10) Patent No.: US 7,975,684 B2
(45) Date of Patent: Jul. 12, 2011

(54) BARBECUE STOVE

(76) Inventor: Jui-Ju Yeh, Taipei (TW)

( * ) Notice: Subject to any disclaimer, the term of this patent is extended or adjusted under 35 U.S.C. 154(b) by 214 days.

(21) Appl. No.: 12/456,310

(22) Filed: Jun. 15, 2009

(65) Prior Publication Data

US 2010/0313872 A1    Dec. 16, 2010

(51) Int. Cl.
*A47J 37/07* (2006.01)
(52) U.S. Cl. 126/25 R; 126/220; 292/204; 292/DIG. 69
(58) Field of Classification Search .......... 126/25 R, 126/220; 292/96, 101, 103, 195, 202, 204, 292/DIG. 11, DIG. 69; 150/152, 118; 70/66, 70/159
See application file for complete search history.

(56) References Cited

U.S. PATENT DOCUMENTS

| 2,715,897 | A | * | 8/1955 | Newland et al. | 126/29 |
| 6,439,221 | B1 | * | 8/2002 | Ward et al. | 126/25 R |

* cited by examiner

*Primary Examiner* — Alfred Basichas
(74) *Attorney, Agent, or Firm* — William E. Pelton, Esq.; Cooper & Dunham LLP

(57) ABSTRACT

A barbecue stove has a cover, a pan, a connecting bracket and a fastener. The cover is alternatively opened or closed relative to the pan and has an edge. The pan has a sidewall and an edge. The connecting bracket is mounted on the sidewall of the pan. The fastener is mounted pivotally on the connecting bracket and has a clip. By operating the fastener, the edges of the cover and the pan are stably held together in a closed state by the clip of the fastener.

16 Claims, 7 Drawing Sheets

BARBECUE STOVE

BACKGROUND OF THE INVENTION

1. Field of the Invention

The present invention relates to a barbecue stove, and more particularly to a barbecue stove that fastens a cover to a pan.

2. Description of the Prior Arts

A barbecue has a pan and a grill. Fuel, such as charcoal or gas is lit as a heat source, and the grill is placed above the heat source. Then food is placed on the grill for cooking.

Conventional barbecues have a hinge connecting a cover to pan for and may be fixed or portable barbecues. Fixed barbecues are for yards, gardens or roofs and may be built in or on wheels, but are not easily transportable. Portable barbecues may be carried and reused or disposable. However, the cover and the pan have no fastening device, so the cover pan opens easily when transporting the barbecue so ash, dirt and cinder may empty out of the barbecue causing mess.

To overcome the shortcomings, the present invention provides a barbecue stove to mitigate or obviate the aforementioned problems.

SUMMARY OF THE INVENTION

The main object of the present invention is to provide a barbecue stove that can fasten a cover to a pan.

A barbecue stove comprises a cover, a pan, a connecting bracket and a fastener. The cover is alternatively opened or closed relative to the pan and has an edge. The pan has a sidewall and an edge. The connecting bracket is mounted on the sidewall of the pan. The fastener is mounted pivotally on the connecting bracket and has a clip. By operating the fastener, the edges of the cover and the pan can be stably held together in a closed state by the clip.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
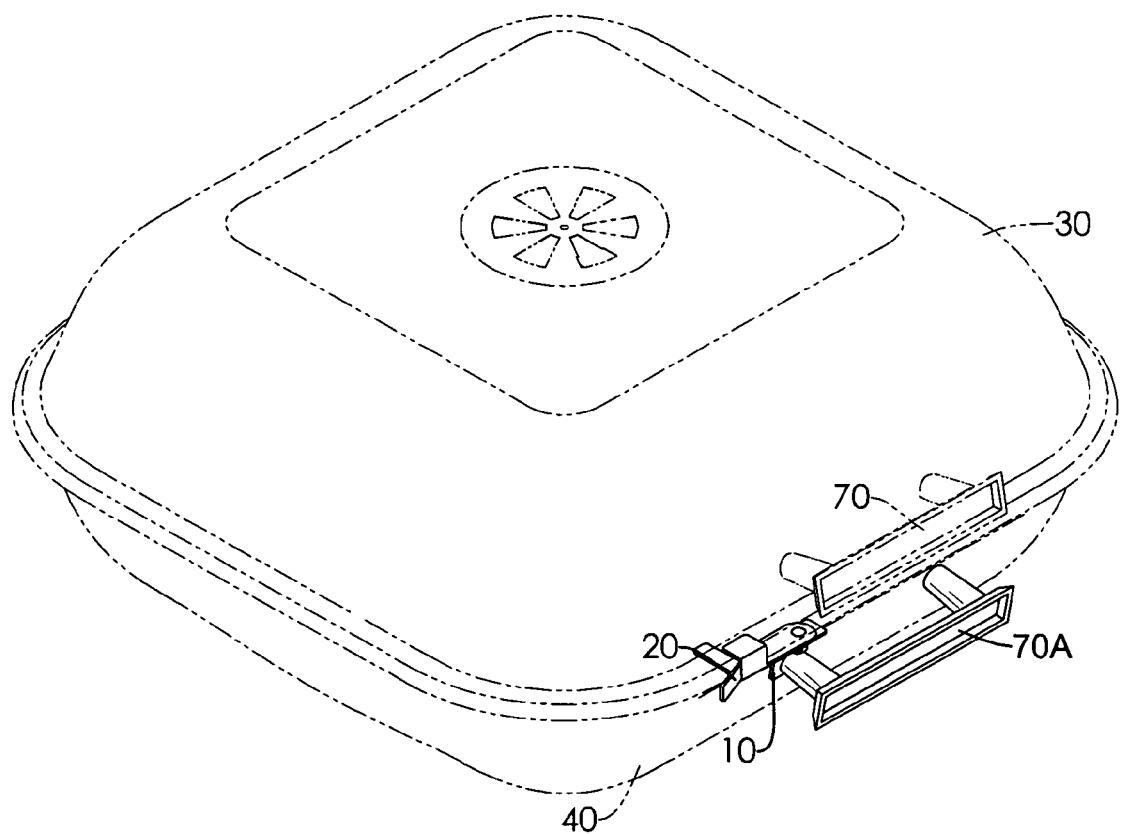
FIG. 1 is a perspective view of a barbecue stove in accordance with the present invention.
Figure 2:
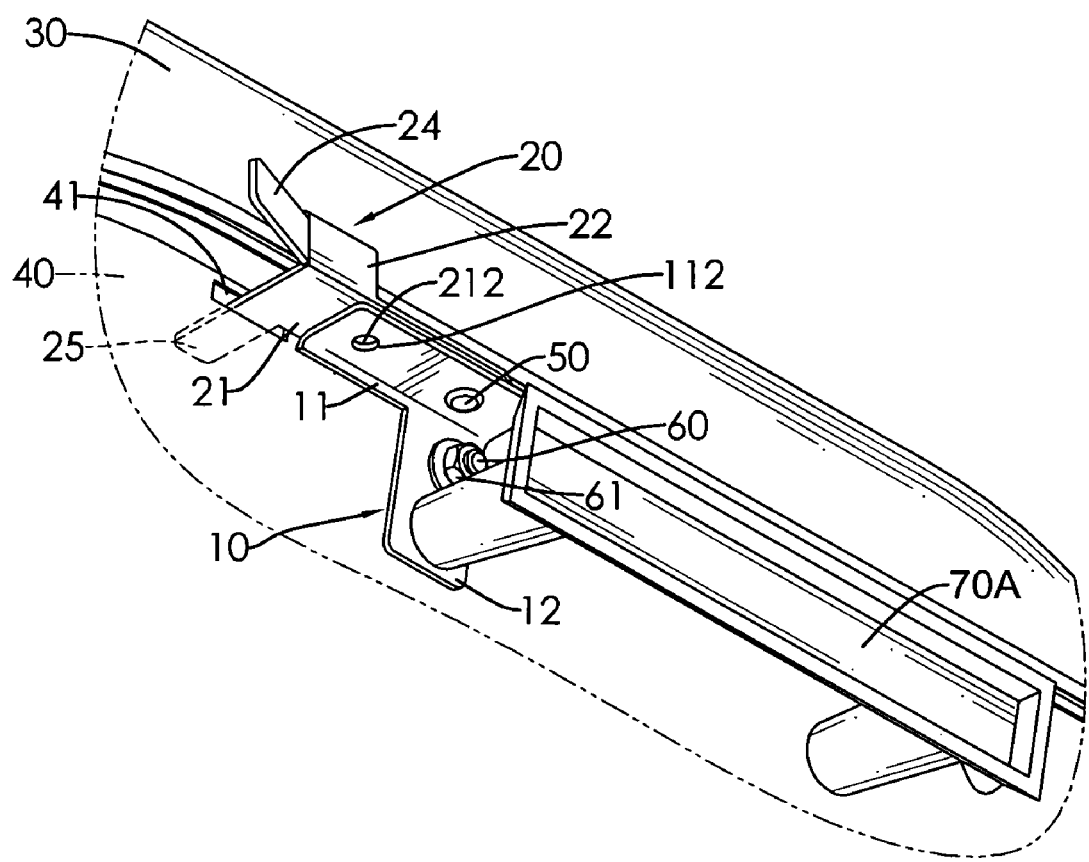
FIG. 2 is a partially enlarged perspective view of the barbecue stove in FIG. 1.
Figure 3:
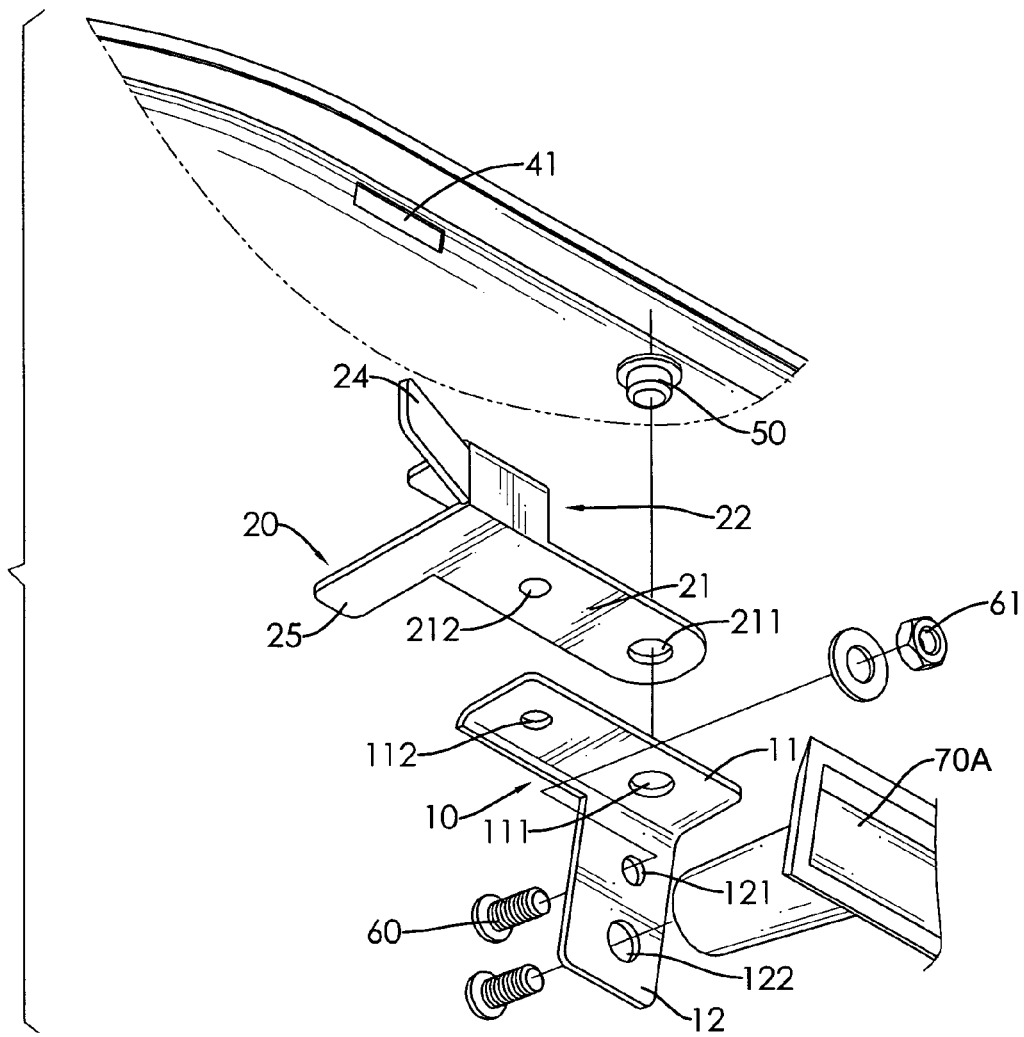
FIG. 3 is an enlarged exploded perspective view of the barbecue stove in FIG. 1.

With reference to FIGS. 1 to 3, a barbecue stove in accordance with the present invention comprises a cover (30), a pan (40), a connecting bracket (10) and a fastener (20).

The cover (30) has a sidewall, an edge and an upper handle (70). The upper handle (70) is attached to the sidewall of the cover (30).

The pan (40) is connected pivotally to the cover (30) and has a sidewall, a recess (41), an edge and a lower handle (70A). The recess (41) is formed through the sidewall of the pan (40). The lower handle (70A) is attached to the sidewall of the pan (40) and corresponds to the upper handle (70) of the cover (30).

The connecting bracket (10) is mounted on the sidewall of the pan (40) and has a main panel (11). The main panel (11) has a surface, a pivot hole (111) and a side. The pivot hole (111) is formed through the surface of the main panel (11). In a preferred embodiment, the connecting bracket (10) further has an extending panel (12). The extending panel (12) protrudes from the side of the main panel (11) and has a surface. The main panel (11) further has a positioning part (112) and holes (121,122). The positioning part (112) is formed on the surface of the main panel (11) and may be a recess or a hole. The holes (121,122) are formed through the surface of the extending panel (12) in intervals.

The fastener (20) is mounted pivotally on the connecting bracket (10) and has a fastening panel (21) and a clip (22). The fastening panel (21) has a surface, a pivot hole (211) and a side. The pivot hole (211) is formed through the surface of the fastening panel (21) and aligns with the pivot hole (111) of the main panel (11) of the connecting bracket (10). The clip (22) is formed on the side of the fastening panel (21) and selectively holds the edges of the cover (30) and the pan (40).

In a preferred embodiment, the fastening panel (21) further has a positioning protrusion (212), a tongue (25) and a pressing segment (24). The positioning protrusion (212) protrudes from the surface of the fastening panel (21), and corresponds to and engages in the positioning part (112) of the main panel (11). The tongue (25) protrudes from and is in the same plane with the fastening panel (21), and corresponds to and engages in the recess (41) of the pan (40). The pressing segment (24) protrudes from and is inclined to the clip (22) of the fastener (20) and offers convenient operation.

Figure 4:
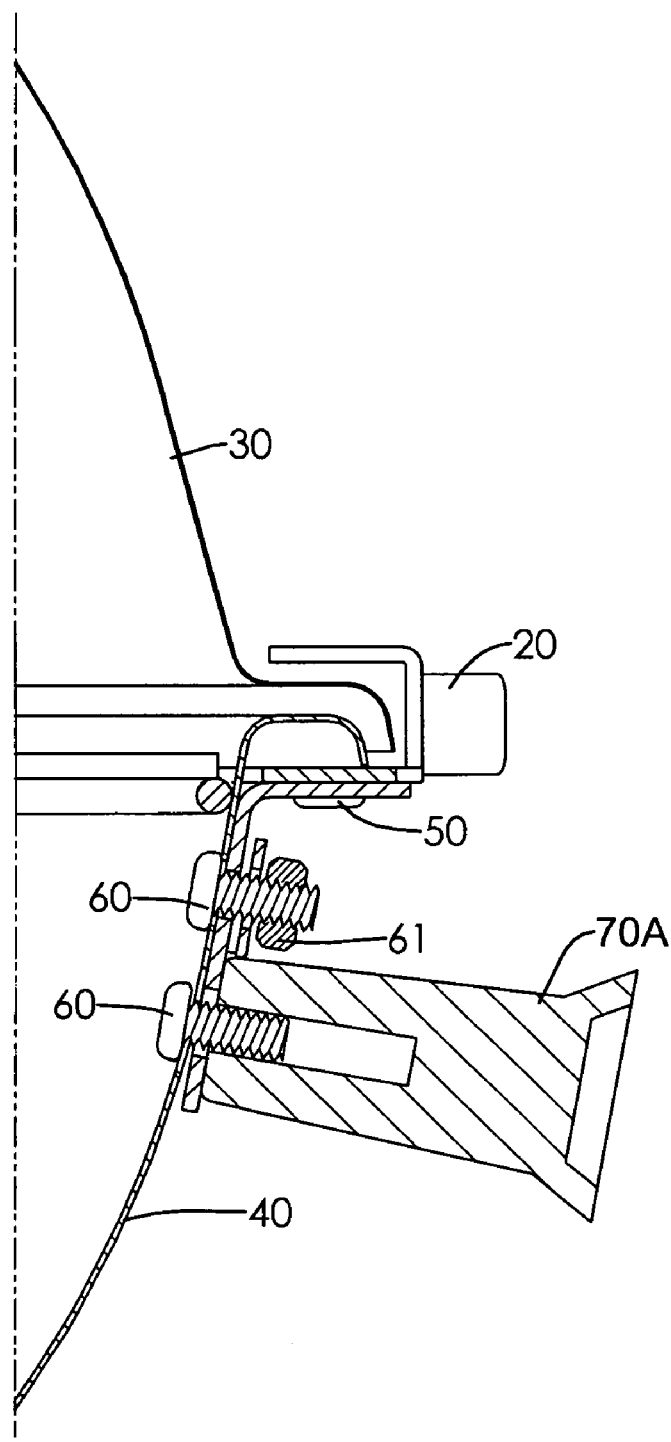
FIG. 4 is an enlarged side view in partial section of the barbecue stove in FIG. 1.

With reference to FIGS. 3 and 4, a screw (60) is mounted through the sidewall of the pan (40) and the hole (121) of the connecting bracket (10). A nut (61) is screwed on the screw (60). The screw (60) may further be mounted in the lower handle (70A) of the pan (40). A pin (50) is mounted through the pivot hole (211) of the fastener (20) and the pivot hole (111) of the connecting bracket (10) to connect the connecting bracket (10) and the fastener (20) pivotally.

Figure 5:
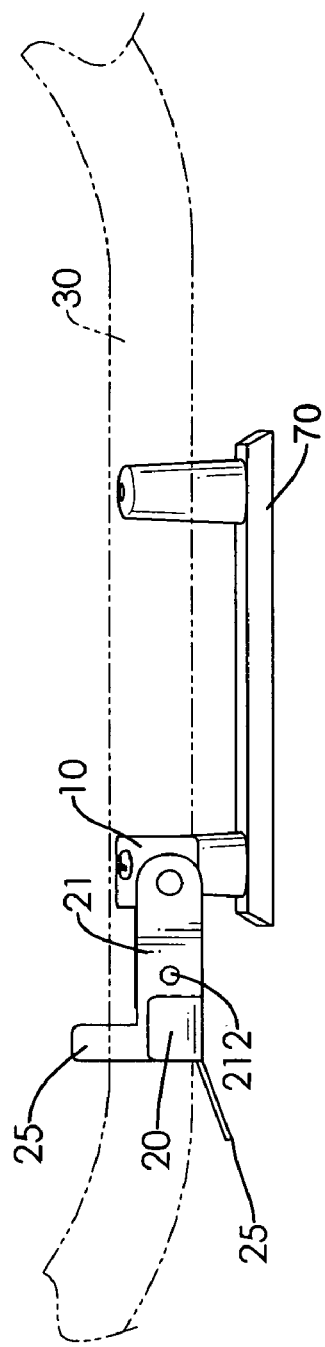
FIGS. 5 and 6 are enlarged operational top views of the barbecue stove in FIG. 1, showing the fastener in different positions.

With reference to FIGS. 2 and 5, when the cover (30) and the pan (40) are in a closed state, the pressing segment (24) of the fastening panel (21) is pressed to mount the tongue (25) of the fastener (20) through the recess (41) of the pan (40). The positioning protrusion (212) of the fastening panel (21) engages in the positioning part (112) of the main panel (11), and then the edges of the cover (30) and the pan (40) are held together in the clip (22) of the fastener (20).

Figure 6:
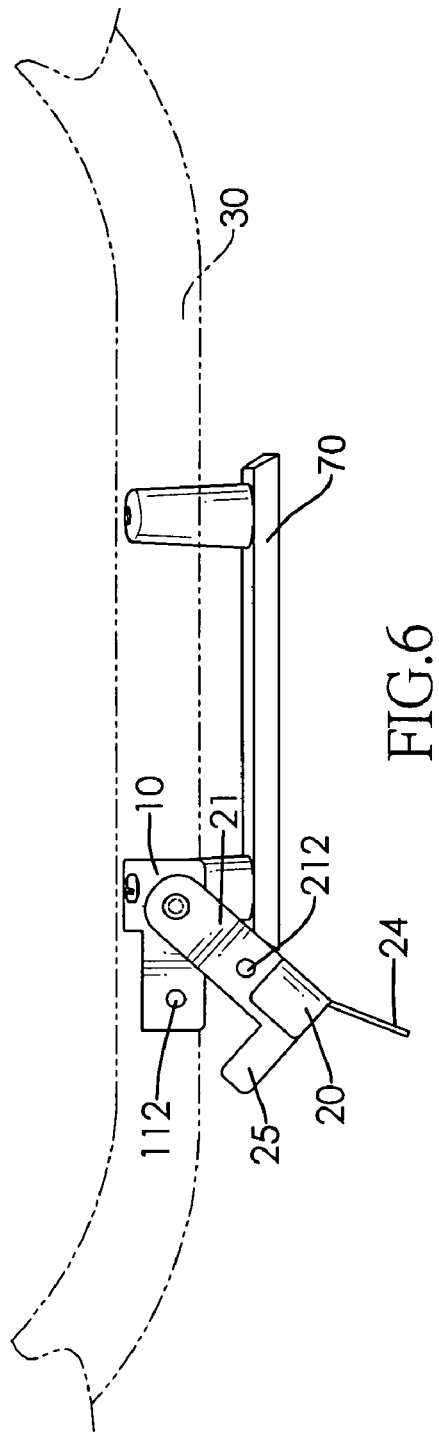

With reference to FIGS. 2 and 6, the pressing segment (24) of the fastening panel (21) is pressed to remove the tongue (25) of the fastener (20) from the recess (41) of the pan (40). The positioning protrusion (212) of the fastening panel (21) disengages from the positioning part (112) of the main panel (11), and then the cover (30) can be opened.

Figure 7:
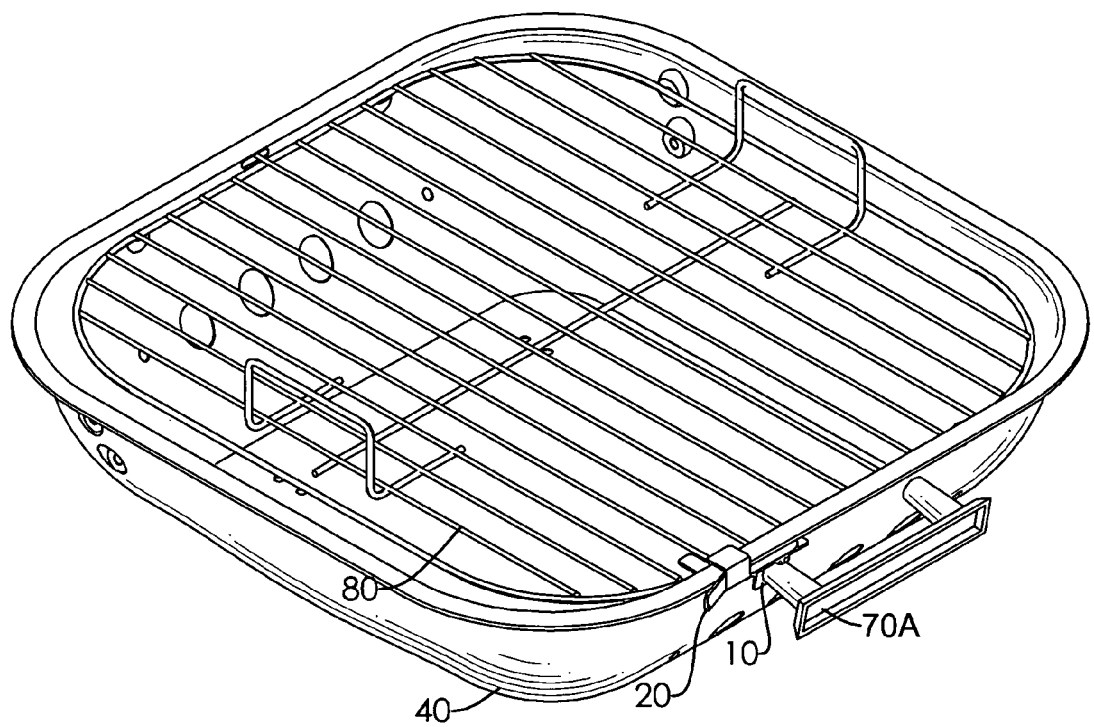
FIG. 7 is a perspective view of the barbecue stove in FIG. 1 shown without the cover.
Figure 8:
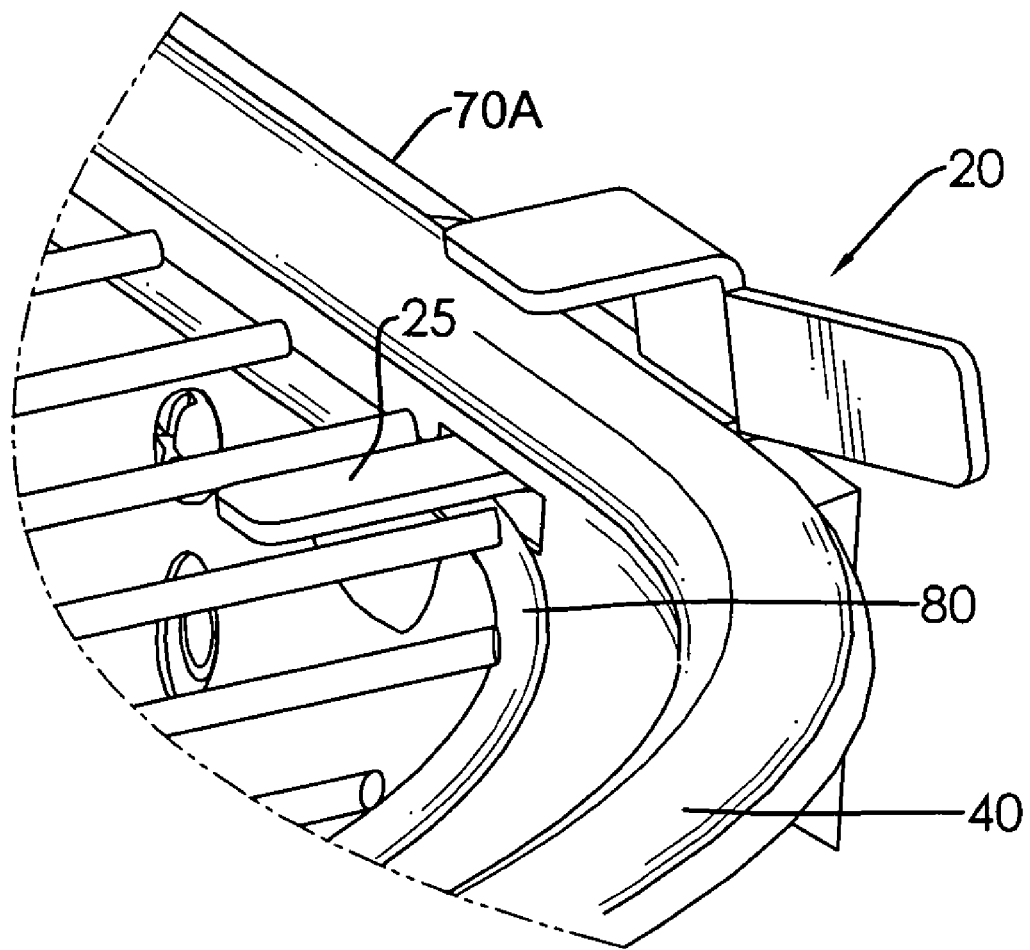
FIG. 8 is a partially enlarged perspective view of the barbecue stove in FIG. 7.

With reference to FIGS. 1, 7 and 8, a barbecue grill (80) is mounted in the pan (40) and can be positioned stably by the tongue (25) of the fastener (20). The barbecue grill (80), cover (30) and the pan (40) are held securely together during transportation.

Therefore, the barbecue stove in accordance with the present invention has a simple structure to hold the cover (30) and the pan (40) together stably. The cover (30) and the pan (40) in a fastened state are convenient to carry and transport.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A barbecue stove comprising:
    a cover having
        a sidewall; and
        an edge;
    a pan connected pivotally to the cover and having
        a sidewall; and
        an edge;
    a connecting bracket mounted on the sidewall of the pan and having
        a main panel having
            a surface; and
            a pivot hole formed through the surface of the main panel; and
    a fastener mounted pivotally on the connecting bracket and having
        a fastening panel having
            a surface;
            a pivot hole formed through the surface of the fastening panel and aligning with the pivot hole of the main panel of the connecting bracket; and
            a side; and
        a clip formed on the side of the fastening panel and selectively holding the edges of the cover and the pan.

2. The barbecue stove as claimed in claim 1, wherein
    the main panel of the connecting bracket further has a positioning part formed on the surface of the main panel; and
    the fastening panel of the fastener further has a positioning protrusion protruding from the surface of the fastening panel and corresponding to and engaging in the positioning part of the main panel.

3. The barbecue stove as claimed in claim 2, wherein
    the pan further has a recess formed through the sidewall of the pan; and
    the fastening panel of the fastener further has a tongue protruding from the fastening panel and corresponding to and engages in the recess of the pan.

4. The barbecue stove as claimed in claim 3, wherein the fastening panel further has a pressing segment protruding from and inclined to the clip of the fastener.

5. The barbecue stove as claimed in claim 4, wherein
    the cover further has an upper handle attached to the sidewall of the cover; and
    the pan further has a lower handle attached to the sidewall of the pan and corresponding to the upper handle of the cover.

6. The barbecue stove as claimed in claim 3, wherein
    the cover further has an upper handle attached to the sidewall of the cover; and
    the pan further has a lower handle attached to the sidewall of the pan and corresponding to the upper handle of the cover.

7. The barbecue stove as claimed in claim 2, wherein the fastening panel further has a pressing segment protruding from and inclined to the clip of the fastener.

8. The barbecue stove as claimed in claim 7, wherein
    the cover further has an upper handle attached to the sidewall of the cover; and
    the pan further has a lower handle attached to the sidewall of the pan and corresponding to the upper handle of the cover.

9. The barbecue stove as claimed in claim 2, wherein
    the cover further has an upper handle attached to the sidewall of the cover; and
    the pan further has a lower handle attached to the sidewall of the pan and corresponding to the upper handle of the cover.

10. The barbecue stove as claimed in claim 1, wherein
    the pan further has a recess formed through the sidewall of the pan; and
    the fastening panel of the fastener further has a tongue protruding from the fastening panel and corresponding to and engages in the recess of the pan.

11. The barbecue stove as claimed in claim 10, wherein the fastening panel further has a pressing segment protruding from and inclined to the clip of the fastener.

12. The barbecue stove as claimed in claim 11, wherein
    the cover further has an upper handle attached to the sidewall of the cover; and
    the pan further has a lower handle attached to the sidewall of the pan and corresponding to the upper handle of the cover.

13. The barbecue stove as claimed in claim 10, wherein
    the cover further has an upper handle attached to the sidewall of the cover; and
    the pan further has a lower handle attached to the sidewall of the pan and corresponding to the upper handle of the cover.

14. The barbecue stove as claimed in claim 1, wherein the fastening panel further has a pressing segment protruding from and inclined to the clip of the fastener.

15. The barbecue stove as claimed in claim 14, wherein
    the cover further has an upper handle attached to the sidewall of the cover; and
    the pan further has a lower handle attached to the sidewall of the pan and corresponding to the upper handle of the cover.

16. The barbecue stove as claimed in claim 1, wherein
    the cover further has an upper handle attached to the sidewall of the cover; and
    the pan further has a lower handle attached to the sidewall of the pan and corresponding to the upper handle of the cover.

* * * * *